UNITED STATES PATENT OFFICE.

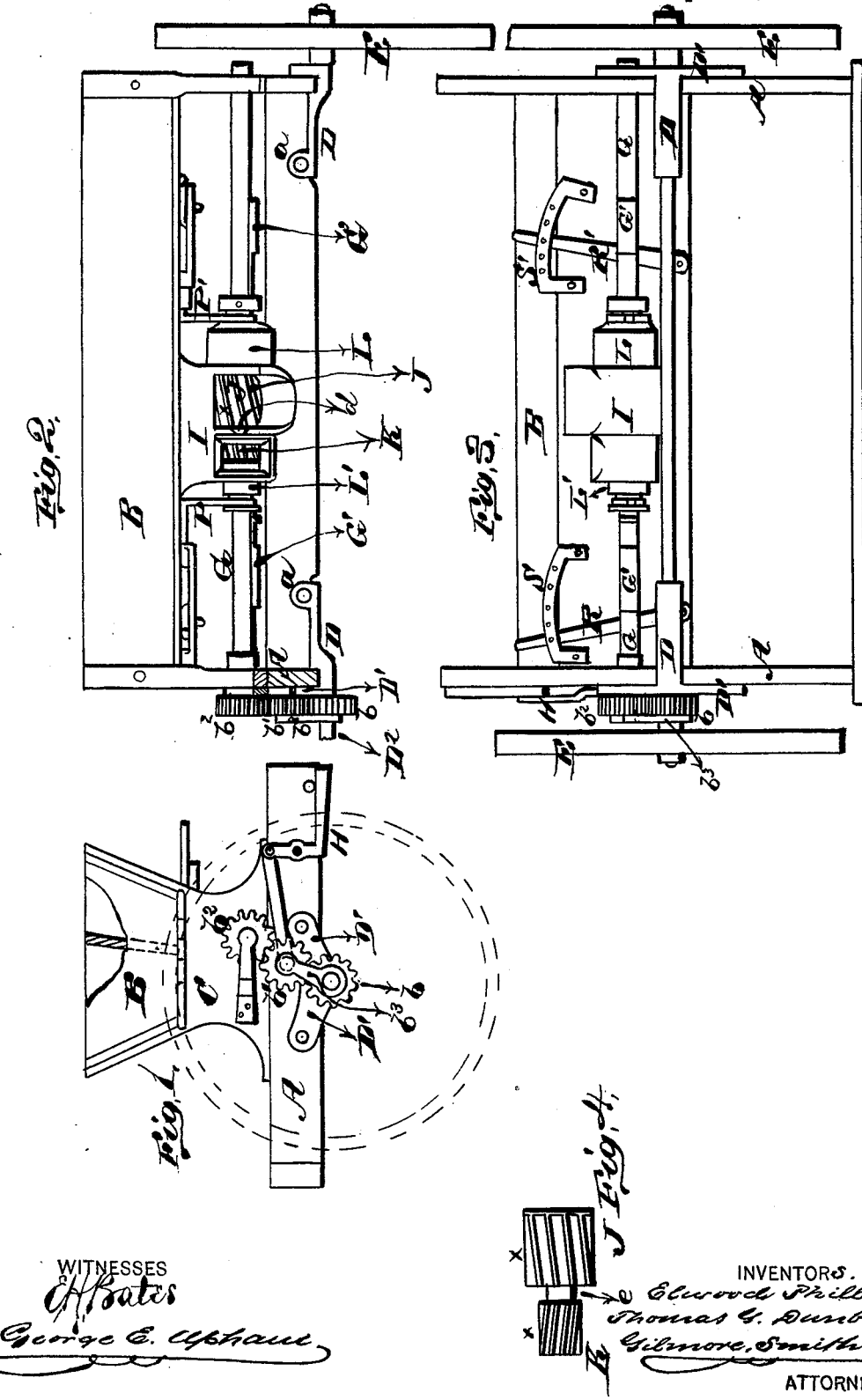

ELWOOD PHILLIPS AND THOMAS G. DUNBAR, OF CENTREVILLE, INDIANA.

IMPROVEMENT IN GRAIN AND SEED DRILLS.

Specification forming part of Letters Patent No. 195,393, dated September 18, 1877; application filed June 30, 1877.

*To all whom it may concern:*

Be it known that we, ELWOOD PHILLIPS and THOMAS G. DUNBAR, of Centreville, in the county of Wayne and State of Indiana, have invented a new and valuable Improvement in Grain and Seed Drills; and we do hereby declare that the following is full, clear, and exact description of the construction and operation of the same, reference being had to the annexed drawings, making a part of this specification, and to the letters and figures of reference marked thereon.

Figure 1 of the drawings is a representation of a part sectional side elevation of our grain and seed drill. Fig. 2 is a rear view. Fig. 3 is a bottom view, and Fig. 4 is a detail of the same.

The nature of our invention consists in the construction and arrangement of a grain and seed drill, as will be hereinafter more fully set forth.

The annexed drawings, to which reference is made, fully illustrate our invention.

A represents the frame of our machine, supporting the grain and seed box B by means of castings C C, secured on top of the side pieces of the frame, and having suitable arms to embrace and hold the box. To the under side, at each end of the center-bar of the frame, is attached a metal bar, D, having ears $a$ $a$ at its inner end, extending upward close against the front and rear side thereof, and fastened thereto by bolts or screws. At the outer end of the metal bar D are diverging arms D' D', which are fastened to the side bar of the frame, thus making the whole firm and secure. From the outer end of said metal bar D extends a spindle, $D^2$, to receive the driving-wheel E.

By the use of these short spindles we dispense with the iron axle in common use, which always springs more or less, and causes the drill to run hard, while our spindles remain in their places and are much cheaper.

To the inner end of the hub of one of the driving-wheels E is attached a pinion, $b$, which, through the medium of an idle-pinion, $b^1$, communicates motion to a pinion, $b^2$, for rotating the grain-shaft G. The idle-pinion $b^1$ is mounted on a stud projecting from an arm, $b^3$, which is placed around the hub of the wheel E, and is operated by a lever, H, for throwing it in and out of gear with the pinion $b^2$. This latter pinion is formed with an elongated hub, which passes through and has its bearing in the standard or casting C, and the shaft G passes into said hub, and is movable laterally therein.

The box B is, by a longitudinal partition, divided into two apartments—one for grain and the other for grass seed—having holes in the bottom, as shown, for the discharge of the grain and seed, and these holes are arranged to correspond, so that one of each will open into a metal hopper, I, below. This hopper is made double, as shown, one side being used for the grain-feed roller J, and the other for the grass-seed roller K, and this hopper also serves or acts as bearings for the shaft G, running through it. It is attached to the bottom of the grain-box by screws or bolts.

The feed-rollers J and K are formed with diagonal or spiral flutes or grooves $x$ $x$, giving a double-force feed, or a continual feed, wheat and seed passing from them at all times. Before one groove or flute is exhausted another commences to discharge its wheat or seed, so that there is a continual flow of grain and seed all the time.

The two rollers J and K are made in one piece, with a circumferential groove, $e$, separating them. These rollers have the grain-shaft G and seed-shifter G' passing through them freely, not being fast to them in any way, but held to the hoppers by a key, $d$, between the hoppers, fitting in the groove $e$, thus allowing them to turn freely, while preventing any lateral motion. The hole in the feed-rollers is square, which causes them to be turned by the shaft.

The shifter G', just mentioned, is simply a straight bar laid on one side of the shaft G, and its use will be presently explained.

L L' are two sleeves or covers for the feed-rollers. The sleeve L is attached to the grain-shaft G, and by its lateral movement regulates the quantity of grain sown. The sleeve L' is attached to the shifter G', and by its movement regulates the quantity of grass-seed sown. There are, of course, a series of these double hoppers, with their feed-rollers and sleeves or covers, and the two sets of sleeves or covers work independently of each other, being thrown in or out by two separate levers, R R', so that grass-seed may be sown in small or large quantities, with any amount of grain.

P P' are right-angular levers, connected to the sleeves or covers L L', respectively, by one end of each being so shaped as to fit in a groove in the sleeve, allowing the sleeve to turn freely, and the other ends connected to the levers R R', which are used to throw the sleeves out and in, and which work over indexes S S', to show the quantity sown.

The right-angular levers P P' are attached to but one of their respective sets of sleeves. As all the sleeves of each set are connected to the same shaft or shifter, they, of course, move together.

What we claim as new, and desire to secure by Letters Patent, is—

1. The double cups I, constructed to receive the double feed-rolls J K, in combination with the sliding sleeve L and the independent sliding sleeve L', substantially as described, and for the purpose set forth.

2. In a grain and seed drill, a laterally-movable shaft, G, and a laterally-movable shifter, G', each carrying a series of feed-roller covers, and independently-adjustable by separate levers, substantially as and for the purposes herein set forth.

In testimony that we claim the above we have hereunto subscribed our names in the presence of two witnesses.

ELWOOD PHILLIPS.
THOMAS G. DUNBAR.

Witnesses:
R. L. STRICKLAND,
H. A. DILLZ.